US007838575B2

(12) United States Patent
Lang et al.

(10) Patent No.: US 7,838,575 B2
(45) Date of Patent: Nov. 23, 2010

(54) BITUMINOUS MIXTURES COMPRISING THERMOPLASTIC POLYMER MEMBRANES

(75) Inventors: Jiri Lang, Prague (CZ); Stephen L. Cluff, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 71 days.

(21) Appl. No.: 12/339,762

(22) Filed: Dec. 19, 2008

(65) Prior Publication Data
US 2009/0163625 A1    Jun. 25, 2009

Related U.S. Application Data

(60) Provisional application No. 61/008,472, filed on Dec. 20, 2007.

(51) Int. Cl.
*C08K 9/10* (2006.01)
*C08L 95/00* (2006.01)

(52) U.S. Cl. .............. 523/205; 523/206; 523/210; 524/68; 524/69; 524/71

(58) Field of Classification Search .......... 524/59–71; 523/205–216
See application file for complete search history.

(56) References Cited

U.S. PATENT DOCUMENTS

| 3,112,681 A | * | 12/1963 | Gessler et al. ............ 404/31 |
| 3,841,890 A | | 10/1974 | Coaker et al. |
| 4,000,095 A | | 12/1976 | Van Den Berg |
| 4,115,335 A | * | 9/1978 | Reusser et al. ............ 524/68 |
| 4,144,217 A | | 3/1979 | Snelgrove et al. |
| 4,335,036 A | | 6/1982 | Fowell |
| 4,532,271 A | * | 7/1985 | Kai et al. ............ 523/208 |
| 4,902,464 A | | 2/1990 | Cartier et al. |
| 5,219,901 A | * | 6/1993 | Burke et al. ............ 523/205 |
| 5,262,240 A | * | 11/1993 | Dunning et al. ............ 428/404 |
| 5,360,848 A | | 11/1994 | Kuechler et al. |
| 6,093,494 A | * | 7/2000 | Schulz et al. ............ 428/403 |
| 6,743,838 B2 | | 6/2004 | Statz et al. |
| 6,866,712 B1 | | 3/2005 | Rossi et al. |
| 7,157,508 B2 | | 1/2007 | Dean |
| 7,517,922 B2 | * | 4/2009 | Wyman ............ 523/205 |
| 2006/0075928 A1 | | 4/2006 | Richards et al. |

FOREIGN PATENT DOCUMENTS

| EP | 0014646 A1 | 8/1980 |
| EP | 211 103 | * 2/1987 |
| GB | 2350366 A | 11/2000 |
| JP | 07133434 | 5/1995 |
| NL | 7108690 A | 6/1971 |
| NL | 7315833 | 11/1973 |

OTHER PUBLICATIONS

B. E. Wade, Vinyl Acetal Polymers, Encyclopedia of Polymer Science & Technology, Third Edition, 2003, vol. 8:381-399.
PCT International Search Report and Written Opinion for International Application No. PCT/US2008/087656, dated Apr. 29, 2009.

* cited by examiner

*Primary Examiner*—Peter Szekely

(57) ABSTRACT

High performance bituminous mixtures that are useful for the road paving and roofing industries comprise mineral aggregates coated with a thermoplastic polymer composition. Because of their high performance properties, the absence of any aggressive and toxic adhesion promoters and the possibility of using recovered or recycled thermoplastic polymers to form the coating or "membrane," the bituminous mixtures described herein provide an excellent environmentally friendly solution for pavement construction and roofing industries.

16 Claims, No Drawings

BITUMINOUS MIXTURES COMPRISING THERMOPLASTIC POLYMER MEMBRANES

CROSS-REFERENCE TO RELATED APPLICATION

The present application claims priority under 35 U.S.C. §119 to U.S. Provisional Appln. No.61/008,472,filed on Dec 20, 2007, which is incorporated herein by reference in its entirety.

FIELD OF THE INVENTION

The invention relates to high performance bituminous mixtures comprising mineral aggregates coated with a thermoplastic polymer composition. These bituminous mixtures are useful in the road paving and roofing industries.

BACKGROUND OF THE INVENTION

Several patents and publications are cited in this description in order to more fully describe the state of the art to which this invention pertains. The entire disclosure of each of these patents and publications is incorporated by reference herein.

Bitumen is widely used in binders for mineral aggregates in the pavement construction and roofing industries, since bitumen is hydrophobic and has good adhesion and weathering characteristics. Examples of pavement constructions are surfaces intended to provide a carriageway or hard standing for vehicles, e.g. roadways, car parks, airport runways and the like. Bituminous mixtures used for pavement construction and roofing applications are mainly mixtures of inert materials and bitumen. These bituminous mixtures are also known as asphalt, asphaltic mixtures, asphaltic mixes and agglomerates.

During normal use under the weight of traffic and weathering conditions, however, pavement constructions tend to show distress from several causes, including temperature induced permanent deformation or rutting, low temperature induced thermal cracking and load associated fatigue. While mineral aggregates are the major portion of the paving composition, the bitumen-containing binder provides important properties to the mixture. For this reason, it has been a common practice to improve the pavement constructions' mechanical properties and their resistance to various environmental conditions by adding fibrous reinforcing materials, surfactants or polymers to bituminous mixtures. For example, U.S. Pat. No. 6,866,712 describes a bituminous mix for road pavements that comprises bitumen, mineral aggregates and glass filaments as fibrous reinforcing material.

Polymers used to modify bitumen or asphalt can be non-reactive polymers that do not react with the bitumen or asphalt, such as for example ethylene acrylate or vinyl acetate copolymers, styrene polybutadiene or isoprene, ethylene butadiene block copolymers (e.g. SBS, SIS, SEBS copolymers), polyurethane or polyolefins. Alternatively, the modifier may be a co-reactive polymer, such as for example an epoxy-containing polymer (see for example U.S. Pat. No. 6,743,838) or an anhydride-containing polymer (see for example U.S. Pat. No. 7,157,508).

Since polyvinyl butyral (PVB), whether plasticized or plasticizer-free, cannot be homogeneously mixed with molten bitumen, but rather merely forms heterogeneous mixtures, modifications have been developed to improve the homogeneity of the PVB in the bitumen mixtures. For example, adhesion promoters have been developed to overcome such non-homogeneity problems. Nevertheless, many adhesion promoters are aggressive and toxic chemicals. Therefore, this solution is not environmentally friendly.

U.S. Pat. No. 5,360,848 also describes a modified bitumen. The modification includes adding plasticized PVB and also polyalkylene glycol dialkyl ethers and optionally polystyrene as solubilizing agents to bitumen. This modified bitumen can be further mixed with aggregated minerals to provide bituminous mixtures useful as construction materials for road surfaces. In addition to the costs of the chemical solvents and chemicals, however, this solution is also environmentally unfriendly due to the out-gassing of volatile organic compounds that may also be toxic. Additionally, the volatile solubilizing agent does not solve the compatibility issue for the full length of the expected lifetime of the bitumen products.

In this connection, it is apparent that a paving construction that includes recycled materials is also more environmentally friendly. A considerable amount of polymer waste is produced from both domestic and industrial sources. For example, over 100 million $m^2$ of laminated glass are annually produced in countries of the European Union (EU), mostly from the automotive and the construction industries. In spite of attempts to increase the direct recycling of polymer waste, most plastics are currently incinerated or disposed in landfill sites, which is not only problematic from an environmental perspective but is also very expensive. The legislations of many countries in the world are motivating an environmentally friendly waste disposal of laminated glass through "end of life vehicles" approach. For example, EU directives 2000/53/EC and 91/156/EC force the European Union member countries to minimize landfill waste. As a result, glass has to be recycled to a considerable extent. Separated plastics, however, are currently not re-usable for industrial applications and are incinerated or land-filled.

Asphalt/bitumen modification with waste polymers is a remediation technology that has been developed to overcome such problems. The process consists of binding polymeric material that may be contaminated in a stable product, reducing leaching of contaminants to the environment. Recovered or recycled PVB may be obtained from various applications such as for example from laminated glass used for windows in buildings and vehicle windshields, in which plasticized PVB is used as an energy absorbing interlayer between two glass sheets.

Finally, U.S. Patent Appln. Publn. No. 2006/0075928 describes asphalt compositions that are suitable for use in the construction of roads. These asphalt compositions comprise bitumen and a dry portion comprising up to 50 wt % of a plastic material, coarse aggregates and fine aggregates. The plastic material is randomly distributed in the mixture, thus contributing to high viscosity and heterogeneous mixtures. For these reasons, the mechanical properties of the mixtures during the paving process and during the lifetime of the road are difficult to predict.

There remains a need for improved bituminous mixtures having enhanced properties. There is also a need for bituminous mixtures that can be manufactured using a streamlined process that is more economical or more environmentally friendly than conventional techniques.

SUMMARY OF THE INVENTION

It has now been surprisingly found that one or more of the above-mentioned needs can be met by a bituminous mixture comprising i) from 2 to 8 wt % of bitumen (A); ii) from 27 to 98 wt % of mineral aggregates (B); and iii) from 0 to 65 wt % of (C), (D), or a mixture of (C) and (D), wherein (C) represents one or more inorganic fillers and (D) represents mineral aggregates having a particle size of less than 4 mm; wherein (B) are substantially completely coated with a thermoplastic polymer composition and wherein, when present (C), (D) or a mixture of (C) and (D), are not coated, partially coated or substantially completely coated with the thermoplastic polymer composition. These weight percentages are based on the total weight of the bituminous mixture.

Further provided herein is a process for preparing the bituminous mixture described above, which process comprises the steps of:
  a) mixing and heating the mineral aggregates (B) at a temperature between 120 and 240° C.;
  b) adding the thermoplastic polymer composition to the mineral aggregates obtained under (a) and stirring to obtain a substantially completely coated mineral aggregate (B),
  c) adding the bitumen (A) to the mixture obtained under b) and stirring to obtain the bituminous mixture.

Compared with known bituminous mixtures, the bituminous mixture described herein has a formulation that avoids using aggressive and toxic adhesion promoters while maintaining or even improving the physical and mechanical performance of the final product.

DETAILED DESCRIPTION OF THE INVENTION

The following definitions apply to the terms as used throughout this specification, unless otherwise limited in specific instances.

Moreover, unless otherwise defined, all technical and scientific terms used herein have the same meaning as commonly understood by one of ordinary skill in the art to which this invention belongs. In case of conflict, the present specification, including the definitions herein, will control.

Although methods and materials similar or equivalent to those described herein can be used in the practice or testing of the invention, suitable methods and materials are described herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

In addition, the ranges set forth herein include their endpoints unless expressly stated otherwise in limited circumstances. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Moreover, where a range of numerical values is recited herein, unless otherwise stated in specific circumstances, the range is intended to include the endpoints thereof, and all integers and fractions within the range. It is not intended that the scope of the invention be limited to the specific values recited when defining a range. Finally, when the term "about" is used in describing a value or an end-point of a range, the disclosure should be understood to include the specific value or end-point referred to.

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the terms "comprises," "comprising," "includes," "including," "containing," "characterized by," "has," "having" or any other synonym or variation thereof refer to a non-exclusive inclusion. For example, a process, method, article, or apparatus that is described as comprising a particular list of elements is not necessarily limited to those particularly listed elements but may further include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format."

Where an invention or a portion thereof is described with an open-ended term such as "comprising," it is to be understood that, unless otherwise stated in specific circumstances, this description also includes a description of the invention using the terms "consisting essentially of" and "consisting of" as they are defined above.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

As used herein, the term "copolymer" refers to polymers comprising copolymerized units or residues resulting from copolymerization of two or more comonomers. In this connection, a copolymer may be described herein with reference to its constituent comonomers or to the amounts of its constituent comonomers, for example "a copolymer comprising ethylene and 9 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The materials, methods, and examples herein are illustrative only and, except as specifically stated, are not intended to be limiting.

Finally, all percentages, parts, ratios, and the like set forth herein are by weight, unless otherwise stated in specific instances.

Provided herein is a bituminous mixture comprising bitumen and mineral aggregates. The term "bitumen" as used herein refers to a class of black or dark-colored substances, natural or manufactured, composed principally of high molecular weight hydrocarbons. Bitumen is viscous and tar-like, and it may be solid or semi-solid at room temperature. Parenthetically in this connection, the term "asphalt" as used herein refers to mixtures of bitumen with mineral aggregates.

Suitable bitumen (A) for use in the bituminous mixture described herein is essentially any bitumen that may be used in road paving surfaces and similar roadway applications. Generally, any naturally occurring or synthetically manufactured bitumen can be employed in the bituminous mixture described herein. Naturally occurring bitumens include, by way of non-limiting examples, materials derived from native rock asphalt, lake asphalt, and the like. Synthetically manufactured bitumens include, without limitation, by-products of petroleum refining operations and air-blown asphalt, propane asphalt, straight-run asphalt, thermal asphalt and the like. For example, one type of bitumen is the bottom product of crude oil vacuum distillation. Preferred bitumens have a penetration level that ranges from 10 to 200 pens, as defined by the EN 12591 standard for the neat non-modified bitumens and as defined by the EN 14023 standard for the polymer modified bitumens.

The term "mineral aggregates" as used herein includes, without limitation, sand, gravel, crushed stone, stone chips, pebbles, rock dust and the like and mixtures of two or more of these materials. Mineral aggregates suitable for use in the bituminous mixture described herein may comprise any conventional material such as for example granite, limestone and andesite. Mineral aggregates can be obtained by crushing, screening, or blasting of any minerals, but can be obtained also from recycled materials, such as for example recycled roads or demolished buildings. Preferably, the mineral aggregates (B) used in the bituminous mixtures described herein have a particle size of at least 2 mm and fulfill the related physical properties as described in EN 13043. More preferably, the mineral aggregates (B) have a particle size of at least 4 mm, or a size of between 8 and 11 mm.

The mineral aggregates (B) are used in the bituminous mixture in an amount of from 27 to 98 wt %, and preferably in an amount of from 62 to 98 wt %, the weight percentages being based on the total weight of the bituminous mixture.

The bituminous mixture also comprises a thermoplastic polymer composition that substantially completely coats mineral aggregates (B). The thermoplastic polymer composition comprises one or more materials selected from the group consisting of polyolefins, polyamides, polyesters, polyvinyl acetates, styrene-based block copolymers, polyvinyl chlorides (PVC), polyvinyl butyrates (PVB). Also included are copolymers or higher order copolymers of any of the above cited polymers. Higher order copolymers include, e.g., terpolymers and polymers comprising four or more different comonomers.

Polyolefins suitable for use in use in the bituminous mixtures described herein are preferably chosen from among polyethylenes, polypropylenes and mixtures thereof. Polyethylenes may be selected from homopolymers and copolymers of ethylene. Various types of polyethylene homopolymers may be used. For example, ultra low density polyethylene (ULDPE), very low density polyethylene (VLDPE), low density polyethylene (LDPE, density of 0.91-0.94 g/cm$^3$), linear low density polyethylene (LLDPE, density of 0.915-0.925 g/cm$^3$), high density polyethylene (HDPE, density higher than 0.94 g/cm$^3$) or metallocene polyethylene (mPE) are all suitable.

In this connection, the term "ethylene copolymer" refers to a polymer comprising repeat units derived from ethylene and at least one additional monomer. Ethylene copolymers for use in the bituminous mixtures described herein may be chosen from among ethylene alpha-olefins copolymers and terpolymers, ethylene vinyl acetate copolymers, ethylene alkyl (meth)acrylate copolymers and terpolymers, ethylene acid copolymers or their corresponding ionomers and mixtures thereof. "Alkyl(meth)acrylate" refers to alkyl acrylate and/or alkyl methacrylate. Polypropylenes for use in bituminous mixtures described herein may be selected from copolymer or homopolymer polypropylene resins. Preferred ethylene copolymers include, without limitation, ethylene propylene diene monomer (EPDM) and copolymers of ethylene, n-butyl acrylate and glycidyl methacrylate (E/n-BA/GMA).

Polyamides suitable for use in the bituminous mixtures described herein are condensation products of one or more dicarboxylic acids and one or more diamines, or one or more aminocarboxylic acids, or ring-opening polymerization products of one or more cyclic lactams. Examples of suitable polyamides include, without limitation, poly(hexamethylene adipamide) (polyamide 66, PA66, also called nylon 66) and poly(hexamethylene dodecanoamide) (polyamide 612, PA612, also called nylon 612). The polyamides may be amorphous or semi-crystalline.

Suitable polyesters include polymers derived from condensation of diols and diacids (or derivatives thereof). Examples of suitable polyester resins include polyethylene terephthalate (PET) and polybutylene terephthalate (PBT), for example.

Styrene-based block copolymers are composed of polystyrene units and polydiene units. The polydiene units are derived from polybutadiene, polyisoprene or copolymers of these two. Examples of suitable styrene-based block copolymers include styrene-ethylene-butylene-styrene block copolymer (SEBS), styrene-butadiene-styrene block copolymer (SBS) and styrene-isoprene styrene block copolymer (SIS).

Polyvinyl butyrals (PVB) for use in the bituminous mixtures described herein are polyvinyl acetal resins which may be manufactured, depending upon the desired application, with large variations in their structural features and monomer composition. Poly(vinyl butyral), as well as other vinyl acetal polymers, can be manufactured by various methods known in the art. Two methods that have been employed are the solvent process and the aqueous process (see, for example, Vinyl Acetal Polymers, in Wade, B. E., *Encyclopedia of Polymer Science & Technology*, 3$^{rd}$ edition, Volume 8, pages 381-399, Wiley Interscience (Hoboken, N.J., 2003)). In either method, poly(vinyl alcohol) is reacted with an aldehyde in the presence of mineral or organic acid catalysts to produce a poly (vinyl acetal) and water.

Polyvinyl alcohols are high molecular weight resins containing various percentages of hydroxyl and acetate groups produced by hydrolysis of polyvinyl acetate. The conditions of the acetal reaction and the concentration of the particular aldehyde and polyvinyl alcohol used are closely controlled to form polymers containing predetermined proportions of hydroxyl groups, acetate groups and acetal groups. If butyraldehyde is used as the aldehyde, then the resulting acetal is poly(vinyl butyral). The primary differences between different types of polyvinyl butyral relate to differences in molecular weight, differences in the content of hydroxyl, butyral and residual ester groups (for example when PVOH is obtained by incomplete hydrolysis of poly(vinyl acetate)), and differences in the type and content of other additives. A typical PVB resin may have a molecular weight range, according to the Staudinger equation, of from about 30,000 to about 600,000 Da, a range of from about 12% to about 20% by weight of hydroxyl groups calculated as polyvinyl alcohol, and a range of from 0% to about 3% by weight residual ester groups calculated as polyvinyl acetate.

The thermoplastic polymer composition may comprise a virgin polymer, i.e. a polymer that has not been used previously, or a polymer that has been recovered or recycled. Recovered or recycled thermoplastic polymers provide a lower cost with high quality raw material for the use in the bituminous mixture.

In a preferred bituminous mixture, the thermoplastic polymer composition used to coat the mineral aggregates (B) comprises polyvinyl butyral (PVB) that may be virgin PVB or recovered or recycled PVB. Recovered or recycled PVB are preferred in view of the favorable environmental aspects.

PVB used in laminated glass generally contains one or more plasticizers to provide a balance of mechanical properties satisfactory for the subsequent handling of the sheeting and performance in a laminar structure. PVB comprising one or more plasticizers is also referred to as plasticized PVB. Suitable plasticizers include all known plasticizers which are compatible with PVB, and combinations of two or more of these plasticizers. A list of commercially available plasticizers which contains data on their compatibility with PVB can be found, for example, in the *Modern Plastics Encyclopedia*, pages 710 to 719, McGraw-Hill (New York, 1981/1982). Other suitable plasticizers are described in U.S. Pat. Nos. 4,902,464; 3,841,890; 4,335,036 and 4,144,217.

Glass from laminated glasses can be recovered by conventional techniques such as grinding, crushing, and milling the scrap glass to recover the glass cullet, which may be returned to a glass manufacturer for re-processing. The PVB interlayer waste stream which has been created during the segregation process may have a large variety of physical forms as well as significant variations in chemical content, depending on the type of segregation line and on the type of laminated glass. Recovered or recycled PVB chemical compositions usually comprise poly(ethylene terephthalate) (PET), glass and ceramics residuals, inorganic and/or organic components, such as for example copper (Cu) and lead (Pb), polyurethane and SBS rubber. Examples of recovered or recycled PVB compositions suitable for use in the bituminous mixture described herein comprise from about 70 to about 99.5 wt % of PVB, from about 0.5 to about 20 wt % of glass and from about 0 to about 10 wt % of other inorganic and/or organic components, the weight percentage being based on the total weight of the PVB composition.

The physical form of the thermoplastic polymer composition used for coating the mineral aggregates (B) is not limited; however, it can be pellets and preferably it ranges from flakes to bulky chunks and clumps of material. More preferably, the physical form of the thermoplastic polymer composition is flakes, for the optimization of the coating in terms of ratio between the surface and the volume. With the aim of optimizing the coating process in terms of time and homogeneity of the coating, the size of the flakes is preferably less than 100 mm and more preferably less than 5 mm. Preferably, the specific surface area of the flakes made of the thermoplastic composition for coating the mineral aggregates is larger than $10\ cm^2/g$.

The thermoplastic polymer composition that substantially completely coats mineral aggregates (B) of the bituminous mixture may further comprise one or more other modifiers or other additives, including, without limitation, inorganic fillers such as clay, limestone, talc or mica; reinforcing agents such as organic fibers, glass fibers, carbon fibers and metal whiskers; pigments and colorants; antioxidants; ultraviolet light absorbers; flame retardants; antistatic agents; metal deactivators; free-radical scavengers; lubricants; releasing agents; softening agents/plasticizers; other modifiers or additives; or mixtures of two or more thereof. Such modifiers and additives may be combined with the thermoplastic polymer composition by using any melt-mixing method known in the art, such as for example, by using a melt-mixer such as a single or twin-screw extruder, blender, kneader, Haake mixer, Brabender mixer, Banbury mixer, roll mixer, etc.

For aesthetic reasons and/or for highlighting dangerous sections of roads, such as for example pedestrian crosswalks or tunnels, the bituminous mixture may be colored. In comparison with conventional bituminous mixtures, the bituminous mixture described herein allows the reduction of the amount of the bitumen up to 50% for a given design of high performance bituminous mixtures. Therefore, the bituminous mixture described herein also allows the reduction of the amount of necessary pigments or colorants (e.g. $TiO_2$) to offset the black coloration of bitumen and thus bringing up to 50 wt % savings in pigments or colorants.

The average thickness of the thermoplastic polymer composition coating layer on the mineral aggregates (B) is preferably smaller than 1600 μm, more preferably smaller than 400 μm and still more preferably between 2 and 200 μm. A coating of this thickness is generally obtained by using an amount of thermoplastic polymer composition between 0.3 and 10 wt %, preferably between 0.5 and 5 wt %, the weight percentage being based on the total weight of the bituminous mixture. In comparison with conventional bituminous mixtures, the bituminous mixtures described herein comprise an amount of bitumen that may be reduced by up to 50% while maintaining similar physical and mechanical properties or exhibiting improvement in one or more respects.

The bituminous composition may optionally comprise one or more inorganic fillers (C), mineral aggregates that have a particle size of less than 4 mm (D) and that are different from mineral aggregates (B), or mixtures of two or more of these fillers or aggregates. These components, when present, can be added in an amount that is not zero up to an amount of 65 wt % in total (i.e., (C)+(D)), preferably up to 30 wt % in total, to the bituminous mixture, the weight percentages being based on the total weight of the bituminous mixture. When present in the bituminous mixture described herein, components (C) and (D) may be uncoated, partially coated or substantially completely coated with the thermoplastic polymer composition.

The reasons for adding the additional mineral aggregate(s) or inorganic filler(s) include one or more of: to reduce the cost of the bituminous mixture, to facilitate the flow of the bituminous mixture during its manufacture, or to improve mechanical properties of the bituminous mixture during its manufacture, for example. Preferably, the one or more inorganic fillers (C), mineral aggregates having a particle size of less than 4 mm (D), and/or mixtures thereof are added when the size of the mineral aggregates (B) is at least 4 mm.

The one or more inorganic fillers (C) used in the bituminous mixture can be any conventionally used fine particles of rocks of any petrological origin, mineral materials, or materials obtainable from reprocessing of buildings (e.g. sand, cement, clays and the like), and mixtures of two or more of these materials. When used, the one or more inorganic fillers (C) may be present in an amount that is not zero up to an amount of 15 wt %, preferably up to 10 wt %, the weight percentage being based on the total weight of the bituminous mixture. Other inorganic fillers (C) including metal carbonates, such as for example calcium carbonates, magnesium carbonates and mixtures of tow or more metal carbonates, are also suitable for use in the bituminous mixture. Calcium and magnesium carbonates may be obtained as an undersieve fraction resulting from crushing, screening or blasting of any minerals. They can be obtained also from recycled materials, e.g. recycled roads and demolished buildings.

Suitable compositions of the mineral aggregates (D) are as described above with respect to mineral aggregates (B); however, the mineral aggregates (D) have a particle size of less than 4 mm. When used, the mineral aggregates having a particle size of less than 4 mm (D) may be present in an amount that is not zero up to an amount of 50 wt %, preferably up to 20 wt %, the weight percentage being based on the total weight of the bituminous mixture.

With the aim of facilitating the technological aspects of the bituminous mixture preparation process as well as the paving process and mechanical properties of the mixture, fibers may be further added to the bituminous mixture. When used, the fibers are present in an amount that is not zero up to an amount of 1 wt %, the weight percentage being based on the total of weight of the bituminous mixture. The fibers may comprise synthetic or natural materials and include, for example, mineral fibers, cellulose fibers, synthetic fibers such as polymer fibers, or mixtures thereof, cellulose fibers being preferred. Typically such fibers are obtained from paper or cloth recycling processes.

The bituminous mixture may be prepared by a process that involves mixing and heating the mineral aggregates (B) in conventional asphalt mixing stations at a temperature between 120 and 240° C., preferably between 150 and 190° C., adding the thermoplastic polymer composition and stirring so that the mineral aggregates are uniformly coated, or substantially completely coated, with the thermoplastic polymer composition. Preferably, the stirring is maintained for a period up to 15 minutes, and more preferably for a period between 5 and 60 seconds.

If used, the one or more inorganic fillers (C), the mineral aggregates having a particle size of less than 4 mm (D), the fibers, or any combination of two or more of these may be added to the substantially completely coated mineral aggregates. The mixture is stirred to obtain a substantially uniform mixture, wherein (C), (D), the fibers, or the combination of two or more of (C), (D) and fibers are present at roughly the same weight ratios, with respect to the mineral aggregates (A), throughout the mixture. Preferably, the stirring is maintained for a period of up to 15 minutes, and more preferably for a period between 5 and 60 seconds. Heating may optionally continue during the addition of (C), (D) or the fibers. The inorganic fillers, the smaller mineral aggregates and the fibers are preferably substantially completely coated with the thermoplastic polymer composition. They may be partially coated, however, or even uncoated. Bitumen (A) is then injected to the mixture, for example in the mixing vessel which is held at a temperature between 120 and 240° C. The bitumen (A) itself may be at any temperature when it is added to the mixing vessel, provided that it is not intractable, for example, solid when it is desired to flow the material through a pipe into the mixing vessel. The bituminous mixture is stirred for an additional period, preferably of up to 15 minutes and more preferably for a period between 5 and 60 seconds. Again, the heating of the mixing vessel may optionally be continued during this stirring.

In comparison with known or conventional bituminous mixtures, the bituminous mixtures described herein exhibit superior performance. Without wishing to be held to theory, it is believed that this superior performance results from the development of a thermoplastic polymer elastic membrane or coating that contributes to a strong and durable bond between the mineral aggregates and the bitumen. Because of their performance properties, the absence of any aggressive and toxic adhesion promoters and the possibility of using recovered or recycled thermoplastic polymers, the bituminous mixtures described herein are an excellent environmentally friendly solution for the pavement construction and roofing industries. Examples of pavement constructions are surfaces intended to provide a carriageway or hard standing for vehicles, e.g. roadways, highways, exit ramps, streets, car parks, airport runways and the like.

The invention will be further described in the Examples below, which are provided to describe the invention in further detail. These Examples, which set forth a preferred mode presently contemplated for carrying out the invention, are intended to illustrate and not to limit the invention.

EXAMPLES

The following materials were used:
Bitumen (A): Bitumen A50/70 (50/70 pen grade) commercially available from refinery Ceska Rafinerska, LITVINOV, Czech Republic.
Polymer Particles: Poly(vinyl butyral) (PVB) particles having an average thickness of 400 μm and a particle size of 2-4 mm and which are made of a commercial PVB (supplied by E.I. du Pont de Nemours and Company, Wilmington, Del., under the trademark Butacite®) and further comprising about 5 wt % of glass particles, the weight percentage being based on the total weight of the thermoplastic polymer.
Mineral aggregates (B): Having a granitic origin and having a particle size between 8 and 11 mm.
Mineral aggregates (C): Having a granitic origin and having a particle size below 4 mm.
Inorganic filler (D): Having petrological origin of various types, finely sieved particles in which the majority of the particles are smaller than 0.1 mm, and most commonly 70% or more pass through a sieve with 0.063 mm mesh.

Ingredient quantities are given in weight percentages (wt %) based on the total weight of the bituminous mixture.

Bituminous Mixture of Example E1

The mineral aggregate (B) having a particle size between 8 and 11 mm (64 wt %) was heated in a hot mix vessel at 180° C. and stirred for 20 seconds using a single propeller paddle mixer. Then, the PVB particles (0.8 wt %) were added to the vessel and the mixture was stirred for 40 seconds to spread the polymer evenly to form a membrane, thus producing the coated mineral aggregate. The mineral aggregate (C) (19.5 wt %) and inorganic filler (D) (10.1 wt %), were added to the mineral aggregate (B) and stirred for 10 seconds. Bitumen (A) (in bulk of 5.6 wt %) was added to the above mixture of mineral aggregates and thermoplastic polymer composition at a temperature of 170° C. and the resulting bituminous mixture was stirred for 20 seconds.

Bituminous Mixture of Comparative Example C1

A mixture comprising the mineral aggregates (B) having a particle size between 8 and 11 mm (64 wt %), the mineral aggregates (C) (19.5 wt %) and inorganic filler (D) (10.4 wt %) was stirred for 10 seconds, heated in a hot mix vessel at 180° C. and further stirred for 20 seconds using a single propeller paddle mixer. Bitumen (in bulk of 6.1 wt %) was added at a temperature of 170° C. to the mineral aggregates and the resulting bituminous mixture was stirred for 20 seconds.

Bituminous Mixture of Comparative Example C2

A mixture comprising the mineral aggregates (B) having a particle size between 8 and 11 mm (64 wt %), the mineral aggregates (C) (19.5 wt %) and inorganic filler (D) (10.1 wt %) was heated in a hot mix vessel at 180° C. and further stirred for 20 seconds using a single propeller paddle mixer. Then, the PVB particles (0.8 wt %) were added to the vessel and the mixture was stirred for 60 seconds to spread the polymer evenly to form a best possible polymer membrane on the surfaces of the particulate components of the mixture, i.e., the mineral aggregates having a particle size between 8 and 11 mm (64 wt %), the mineral aggregates (C) (19.5 wt %) and inorganic filler (D) (10.1 wt %). Bitumen (A) (in bulk of 5.6 wt %) was added to the above mixture of mineral aggregates and thermoplastic polymer composition at a temperature of 170° C. and the resulting bituminous mixture was stirred for 20 seconds.

Performance Tests a) Permanent deformation. The permanent deformation, i.e. irreversible structural change caused by high pressure on the surface at specified temperature of the bituminous mixtures of Example E1 and Comparative Examples C1 and C2 was determined by the wheel tracking test and by the French wheel tracking test.

The wheel tracking test, described in the EN 12697-22 standard, according to which a loaded wheel repeatedly travels across the specimen under analysis at a constant temperature, has been used to simulate the action of traffic and to predict the rutting and/or stripping potential of the sample. The test specimens had dimensions of 260×300 mm. A treadless tire with an external diameter between 200 and 205 mm and a rectangular cross profile with a track width of 50 mm travelled 230 mm over the specimen with a frequency of 26.5 load cycles/min for a total of 10,000 load cycles. The rolling load applied to the test specimen was 700 N. The load cycles were applied to the test specimen at a temperature of 50° C.

In the French wheel tracking test, the test specimens had dimensions of 500×180×50 mm. A wheel fitted with a 400×8 mm pneumatic tire without a tread pattern and having a track width of 80 mm travelled 410 mm over the specimen with a frequency of 1 Hz for a total of 30,000 load cycles. The rolling load applied to the test specimen was 5000 N at the centre of the test specimen. The load cycles were applied to the test specimen at a temperature of 60° C.

The test specimen E1 exhibited a permanent deformation that is decreased by more than 55% with respect to that of comparative test specimen C1. Indeed, in the wheel tracking test, the rutting depth of test specimen E1 was 1.03 mm after 10,000 cycles and a temperature of 50° C. in comparison with 2.18 mm for the comparative test specimen C1 and 1.22 mm for the comparative test specimen C2. In the French wheel tracking test, the relative deformation after 30,000 cycles at a temperature of 60° C. was below 4% for E1 whereas C1 exhibited a deformation of more that 10% and C2 exhibited a deformation below 5%.

b) Critical temperature cracking resistance (TP 151). In order to verify the mechanical relaxation behavior, in addition to the critical cracking temperature, the methodology developed by Dr. Grauer was employed, as referred to in, e.g., Arand, W., "Asphalt roads under the influence of weather and traffic," Eurasphalt & Eurobitume Congress 1996, Paper 4.059. The methodology of Dr. Grauer is analogous to that of AASHTO (American Association of State Highway and Transportation) TP10-93, "Method for Thermal Stress Restrained Specimen Tensile Strength"; however, there are some differences between the two methods with respect to the dimensions and preparation of the test specimens. In the TP 151 method, the residual tension in the tested specimen was measured at a given time at a temperature of 0° C. Test specimens were compacted beams with dimensions of 50×50×300 mm.

Residual tension after 120 seconds in the test specimen (E1) was 17% as opposed to the 30% for the comparative test specimen C1 and 19% for C2.

Moreover, E1 exhibited a critical cracking resistance temperature of −23° C. whereas the comparative test specimen C1 exhibited a critical cracking resistance temperature of −10 °C. and C2 exhibited a critical cracking resistance temperature of −22° C.

c) Retention of mechanical properties under water erosion conditions (EN 12697-12). While it remains difficult to measure the adhesion between the bitumen and the mineral aggregates quantitatively, susceptibility to moisture and resistance towards debonding after soaking are considered to be good indicators of the adhesive strength of the binder and the mineral aggregates. In such procedures, the tensile strength of a test specimen is measured before and after exposure to water, and the ratio of the tensile strengths of the dry and soaked specimens is reported.

The test specimen (E1) exhibited an increased retention of mechanical properties under water erosion conditions thus confirming an increased affinity between the bitumen and the mineral aggregates. Indeed the indirect tensile strength ratio (ITSR) value was greater than 96% whereas the comparative test specimen C1 exhibited a value of less than 70% and the comparative test specimen C1 exhibited a value higher than 90%.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A bituminous mixture comprising:
   i. from 2 to 8 wt % of bitumen (A);
   ii. from 27 to 98 wt % of mineral aggregates (B); and
   iii. from 0 to 65 wt % of (C), (D), or a mixture of (C) and (D), wherein (C) represents one or more inorganic fillers and (D) represents mineral aggregates that are different from mineral aggregates (B) and that have a particle size of less than 4 mm (D),
   wherein the mineral aggregates (B) are substantially completely coated with a thermoplastic polymer composition, and said thermoplastic polymer composition comprises PVB, wherein, when present, the inorganic fillers (C) or the mineral aggregates (D) are uncoated, partially coated or substantially completely coated with the thermoplastic polymer composition, and wherein the weight percentages are based on the total weight of the bituminous mixture.

2. The bituminous mixture according claim 1, wherein the mineral aggregates (B) have a particle size of at least 2 mm.

3. The bituminous mixture according to claim 2, wherein the mineral aggregates (B) have a particle size of at least 4 mm.

4. The bituminous mixture according to claim 1, wherein the average thickness of the thermoplastic polymer coating on the mineral aggregates (B) is smaller than 1600 μm.

5. The bituminous mixture according to claim 4, wherein the average thickness of the thermoplastic polymer coating on the mineral aggregates (B) is between 2 and 200 μm.

6. The bituminous mixture according to claim 1, wherein the amount of the one or more inorganic fillers (C) is a non-zero amount up to 15 wt %.

7. The bituminous mixture according to claim 1, wherein the mineral aggregates having a particle size of less than 4 mm (D) is a non-zero amount up to 50 wt %.

8. The bituminous mixture according to claim 1 further comprising fibers.

9. The bituminous mixture according to any preceding claim, wherein the thermoplastic polymer composition further comprises one or more materials selected from the group consisting of polyolefin, polyamide, polyester, and polyvinylacetate.

10. The bituminous mixture according to claim 1, wherein the thermoplastic polymer composition comprises a recovered or recycled thermoplastic polymer.

11. The bituminous mixture according to claim 10, wherein the thermoplastic polymer composition that coats mineral aggregates (B) comprises recovered or recycled PVB obtained from laminated glass.

12. A process for preparing the bituminous mixtures of claim 1, comprising the steps of:
   a) mixing and heating the mineral aggregates (B) at a temperature between 120 and 240° C.;
   b) adding the thermoplastic polymer composition to the mineral aggregates obtained under (a) and stirring to obtain a uniformly coated mineral aggregate (B),
   c) after the step b), a step of adding one or more inorganic fillers (C), mineral aggregates having a particle size of less than 4 mm (D), fibers or any combination of two or more of (C), (D) and the fibers to the mixture obtained under b) and stirring to obtain a substantially uniform mixture, and
   d) adding the bitumen (A) to the mixture obtained under b) and stirring to obtain the bituminous mixture.

13. The process according to claim 12, wherein the thermoplastic polymer composition added under step b) has the physical form of flakes.

14. The process according to claim 13, wherein the flakes have a size less than 100 mm.

15. The process according to claim 14, wherein the flakes have a size less than 5 mm.

16. The process according to claim 13, wherein the flakes have a specific surface area larger than 10 cm$^2$/g.

* * * * *